US005525385A

United States Patent [19]

Weinstein et al.

[11] Patent Number: 5,525,385
[45] Date of Patent: Jun. 11, 1996

[54] MACROCOMPOSITE BODIES AND METHODS FOR MAKING THE SAME

[75] Inventors: Jerry G. Weinstein; Daniel T. Herzog, both of Newark, Del.; Matthew E. Schreiner, Kemblesville, Pa.

[73] Assignee: Lanxide Technology Company, LP, Newark, Del.

[21] Appl. No.: 979,020

[22] Filed: Nov. 20, 1992

[51] Int. Cl.[6] ............................................... B32B 1/00
[52] U.S. Cl. ........................ 428/34.7; 428/35.8; 428/36.8; 428/36.91; 428/689; 428/698; 138/141; 138/177
[58] Field of Search .......................... 428/312.2, 306.6, 428/307.3, 312.8, 319.3, 688, 34.4, 34.6, 34.7, 36.8, 36.91, 492, 689, 698; 138/140, 141, 149, 177; 384/280, 281, 282, 297; 415/120, 124.2, 126, 127, 128

[56] References Cited

U.S. PATENT DOCUMENTS

| Re. 33,003 | 8/1989 | Dugan | 92/84 |
|---|---|---|---|
| 3,984,308 | 10/1976 | Rastatter | 209/211 |
| 4,075,364 | 2/1978 | Panzera | 427/34 |
| 4,335,998 | 6/1982 | Siebels | 416/213 R |
| 4,336,276 | 6/1982 | Bill et al. | 427/34 |
| 4,541,934 | 9/1985 | Hakola | 210/787 |
| 4,623,458 | 11/1986 | Hakola | 210/238 |
| 4,655,684 | 4/1987 | Haentiens | 415/170 A |
| 4,811,799 | 3/1989 | Blackwell et al. | 175/209 |
| 4,892,786 | 1/1990 | Newkirk | 428/307.3 |
| 4,904,542 | 2/1990 | Mroczkowski | 428/610 |
| 4,974,998 | 12/1990 | Heineman | 406/97 |
| 4,981,761 | 1/1991 | Ookuchi et al. | 428/594 |
| 5,046,922 | 9/1991 | Nakamura et al. | 415/172.1 |
| 5,110,675 | 5/1992 | Newkirk | 428/307.3 |
| 5,344,678 | 9/1994 | Kajiwara | 428/34.4 |

*Primary Examiner*—Ellis P. Robinson
*Assistant Examiner*—Timothy M. Speer
*Attorney, Agent, or Firm*—Kevin J. Boland

[57] ABSTRACT

This invention relates to novel macrocomposite bodies. More particularly, it has been discovered that the properties of a ceramic, ceramic matrix composite or metal matrix composite body may be improved by providing on at least a portion of the surface of the body a polymer-based material which serves to protect the body from damage which might occur in the absence of the polymer-based material. One particularly preferred embodiment of the present invention is a macrocomposite shaft sleeve. Another particularly preferred embodiment is a macrocomposite apex used in a hyrocyclone separator.

17 Claims, 5 Drawing Sheets

MACROCOMPOSITE BODIES AND METHODS FOR MAKING THE SAME

FIELD OF INVENTION

This invention relates to novel macrocomposite bodies and methods for making the same. More particularly, it has been discovered that the properties of a ceramic, ceramic matrix composite or metal matrix composite body may be improved by providing on at least a portion of the surface of the body a polymer-based material which serves to protect the body from damage which might occur in the absence of the polymer-based material. One particularly preferred embodiment of the present invention enhances the performance of shaft sleeves which are used with centrifugal slurry pumps. More particularly, a shaft sleeve fits over the steel or metal shaft of the centrifugal slurry pump in order to protect the shaft from premature wear due to, for example, abrasion. In another preferred embodiment, the shaft sleeve comprises a ceramic, a ceramic matrix composite, or a metal matrix composite material and the polymer-based material is disposed on at least a portion of the inner portion of the shaft sleeve to serve as a liner for the sleeve. The polymer-based interface material is thus situated as an intermediate layer which can relieve potential stresses (e.g., function as a compliant layer) applied to the shaft sleeve when, for example, the shaft of the pump expands due to, for example, thermal expansion at a greater rate than the shaft sleeve. Such different expansion rates could be due to, for example, differing coefficients of thermal expansion (CTEs) between the shaft sleeve and the shaft.

Furthermore, it may be desirable to place the polymer-based materials on the outer surfaces of, for example, a ceramic material in order to protect the ceramic material from, for example, chipping, and so forth, when the ceramic body need only provide wear resistance on its inner surface. For example, an apex used in a hydrocyclone separator may be provided with an outer polymer-based material in order to protect the ceramic material from damage. Additionally, the presence of the polymer-based material may facilitate installation, external machining, etc.

BACKGROUND OF THE INVENTION

In recent years, ceramics, ceramic matrix composites and metal matrix composites have gained increasing acceptance in the industry. More specifically, such materials are attractive due to, for example, increased wear resistance, as opposed to, for example, metals. However, in attempting to incorporate ceramics, ceramic matrix composites and metal matrix composites into applications previously served by metals, complications may arise.

For example, ceramics, ceramic matrix composites and metal matrix composites can be manufactured to have relatively high hardness values. However, such high hardness values may make such materials difficult and expensive to machine. Therefore, as described herein, in certain instances when the end application permits, it may be desirable to provide the ceramic, ceramic matrix composite or metal matrix composite with a polymer-based coating on at least one surface thereof, wherein the polymer-based material is manufactured to be readily machineable and provides an attractive finish. Moreover, certain ceramic, ceramic matrix composite and metal matrix composite materials may be too brittle for certain applications and thus could be susceptible to, for example, chipping or cracking. Therefore, as discussed herein, it may be desirable to provide such materials with a protective polymer-based coating in order to provide the material with suitable protection from chipping or cracking due to, for example, shipping or handling misuse. Furthermore, certain end use applications result in undesirable stresses being applied to such materials. For example, the ceramic, ceramic matrix composite or metal matrix composite may be used in combination with (e.g., coupled) with a material having a substantially different coefficient of thermal expansion (CTE) which can result in the generation of undesirable thermal stresses. Therefore, it may be desirable to provide the ceramic, ceramic matrix composite, or metal matrix composite with a polymer-based material between at least a portion of the interface between the two materials having a different CTE. The interface material can be designed to absorb any stresses realized when two coupled materials expand at differing rates.

One specific application which benefits from the materials of the instant invention are shaft sleeves. Shaft sleeves are used with centrifugal slurry pumps in a part of the pump called a stuffing box. The stuffing box is used to separate the wet end of the pump (i.e., the actual pumping mechanism) from the dry end of the pump (i.e., the gear box and motor). The shaft sleeves of the prior art are generally cylinders of metal that fit tightly onto and around the shaft, which are also generally metal or steel, that connects the motor to the pump end impeller and rotates with the shaft.

Packing material, usually made of, for example, carbon impregnated Teflon® cord is placed around the shaft sleeve and held tightly against it by the steel casing of the stuffing box. The packing is stationary and does not rotate. It is generally desirable to pack the packing material as tightly as possible against the rotating shaft sleeve, since this tight packing will limit the amount of leakage of liquid from the wet end of the pump into the dry end of the pump. However, this creates a significant amount of friction which damages the packing material and wears out the shaft sleeve due to, for example, abrasion. Moreover, when pumping abrasive slurries, the situation is further aggravated because even small leaks of an abrasive slurry may increase the wear on both the packing and the shaft sleeve.

As stated above, the shaft and shaft sleeves of the prior art are generally made of a metal (e.g., steel) and may not be particularly well suited for an erosive and/or corrosive environment which can be generated in a stuffing box of a centrifugal slurry pump. In an effort to promote the life of the shaft sleeves and consequently the shaft of centrifugal pumps, recent attention has been directed to the use of ceramics as shaft sleeve materials due to the advantageous properties of ceramic materials. However, as is well known to those skilled in the art, most metals which can be utilized as a shaft have CTEs which, typically, differ quite significantly from CTEs of most ceramic materials which could be utilized as a shaft sleeve. Therefore, when a metal shaft/ceramic shaft sleeve combination is subjected to friction, which results in the generation of heat in both the metal shaft and ceramic shaft sleeve, the metal or steel shaft tends to expand at a greater rate than the ceramic shaft sleeve resulting in the generation of tensile stresses in the ceramic shaft sleeve, which stresses may cause the ceramic shaft sleeve to crack and/or fail catastrophically.

Another specific example of an application which would benefit from the combination of materials of the instant invention would be hydrocyclone separators. More specifically, the apex of a hydrocyclone separator is subjected to a highly abrasive and/or corrosive environment. Therefore, it may be desirable to utilize a ceramic, ceramic matrix composite or metal matrix composite as at least a portion of an apex because such materials can be manufactured to withstand such an abrasive and/or corrosive environment. However, while a ceramic, ceramic matrix composite or metal matrix composite apex may be well suited for the intended purpose, the outer surface of the apex may be easily damaged during, for example, installation or shipping.

Furthermore, an apex is generally inserted into a steel housing and attached thereto utilizing, for example, an epoxy and a mechanical clamping ring. Accordingly, a ceramic, ceramic matrix composite or metal matrix composite may also be benefited by providing a polymer-based coating on at least a portion of the outer surface thereof.

The present invention provides novel materials which overcome all of the above difficulties. Particularly, for some preferred embodiments of the invention, attractive ceramic, ceramic matrix composite and metal matrix composite materials for use in the present invention have been developed by the assignee of the current application and are discussed herein below.

COMMONLY OWNED PATENT APPLICATIONS

The subject matter of this application is related to that of several Commonly Owned Patents and Commonly Owned and Copending Patent Applications. Particularly, these Patents and Patent Applications describe novel methods for making ceramic matrix composite materials (hereinafter sometimes referred to as "Commonly Owned Ceramic Matrix Patent Applications") and metal matrix composite materials (hereinafter sometimes referred to as "Commonly Owned Metal Matrix Patent(s) and Patent Application(s)").

A novel approach to the formation of ceramic materials is disclosed generically in Commonly Owned U.S. Pat. No. 4,713,360, which issued on Dec. 15, 1987 in the names of Marc S. Newkirk et al and entitled "Novel Ceramic Materials and Methods for Making Same", a European counterpart to which was published in the EPO on Sep. 25, 1985, as Publication No. 0 155 831. This patent discloses a method of producing self-supporting ceramic bodies grown as the oxidation reaction product of a molten parent precursor metal which is reacted with a vapor-phase oxidant to form an oxidation reaction product. Molten metal migrates through the formed oxidation reaction product to react with the oxidant thereby continuously developing a ceramic polycrystalline body which can, if desired, include an interconnected metallic component. The process may be enhanced by the use of one or more dopants alloyed with the parent metal. For example, in the case of oxidizing aluminum in air, it is desirable to alloy magnesium and silicon with the aluminum to produce alpha-alumina ceramic structures. This method was improved upon by the application of dopant materials to the surface of the parent metal, as described in Commonly Owned U.S. Pat. No. 4,853,352, which issued on Aug. 1, 1989, in the names of Marc S. Newkirk et al., and entitled "Methods of Making Self-Supporting Ceramic Materials", a European counterpart to which was published in the EPO on Jan. 22, 1986, as Publication No. 0 169 067.

A novel method for producing a self-supporting ceramic composite by growing an oxidation reaction product from a parent metal into a permeable mass of filler is disclosed in commonly owned and copending U.S. patent application Ser. No. 07/433,733, filed Nov. 30, 1989, and entitled "Method of Making Composite Articles Having Embedded Filler" which is a continuation-in-part of commonly owned U.S. patent application Ser. No. 07/415,180, filed Sep. 29, 1989, now abandoned, which is a divisional of U.S. Pat. No. 4,916,113, issued Apr. 10, 1990, and entitled "Methods of Making Ceramic Articles" which is a continuation of U.S. Pat. No. 4,851,375, issued Jul. 25, 1989, and entitled "Methods of Making Composite Ceramic Articles Having Embedded Filler", a European counterpart to which was published in the EPO on Sep. 3, 1986, as Publication No. 0 193 292, all in the names of Marc S. Newkirk, et al.

A method for producing ceramic composite bodies having a predetermined geometry or shape is disclosed in Commonly Owned U.S. Pat. No. 5,017,526, which issued on May 21, 1991, and entitled "Method of Making Shaped Ceramic Composite", which is a continuation of U.S. application Ser. No. 06/861,025, filed May 8, 1986 (and now abandoned), a European counterpart to which was published in the EPO on Nov. 11, 1987, as Publication No. 0 245 192, both in the names of Marc S. Newkirk et al. In accordance with the method in this U.S. patent, the developing oxidation reaction product infiltrates a permeable preform of filler material in a direction towards a defined surface boundary. It was discovered that high fidelity is more readily achieved by providing the preform with a barrier means, as disclosed in Commonly Owned U.S. patent application Ser. No. 07/659,523, filed Feb. 22, 1991, now allowed, which was a continuation of U.S. patent application Ser. No. 07/295,488, filed Jan. 10, 1989, which is a continuation of U.S. Pat. No. 4,923,832, which issued May 8, 1990, all in the names of Marc S. Newkirk et al., a European counterpart to which was published in the EPO on Nov. 11, 1987, as Publication No. 0 245 193. This method produces shaped self-supporting ceramic bodies, including shaped ceramic composites, by growing the oxidation reaction product of a parent metal to a barrier means spaced from the metal for establishing a boundary or surface.

Ceramic composites having a cavity with an interior geometry inversely replicating the shape of a positive mold or pattern are disclosed in Commonly Owned U.S. Pat. No. 5,051,382, which issued on Sep. 24, 1991, which is a divisional of U.S. Pat. No. 4,828,785, which issued May 9, 1989, both in the names of Marc S. Newkirk, et al., a European counterpart to which was published in the EPO on Sep. 2, 1987, as Publication No. 0 234 704 and in U.S. Pat. No. 4,859,640, which issued on Aug. 22, 1989, a European counterpart to which was published in the EPO on Mar. 9, 1988, as Publication No. 0 259 239.

The feeding of additional molten parent metal from a reservoir has been successfully utilized to produce thick ceramic matrix composite structures. Particularly, as disclosed in Commonly Owned U.S. Pat. No. 4,918,034, issued Apr. 17, 1990, which is a continuation-in-part of U.S. Pat. No. 4,900,699, issued Feb. 13, 1990, both in the names of Marc S. Newkirk et al., and entitled "Reservoir Feed Method of Making Ceramic Composite Structures and Structures Made Thereby", a European counterpart to which was published in the EPO on Mar. 30, 1988, as Publication No. 0 262 075, the reservoir feed method has been successfully applied to form ceramic matrix composite structures. According to the method of this Newkirk et al. invention, the ceramic or ceramic composite body which is produced comprises a self-supporting ceramic composite structure which includes a ceramic matrix obtained by the oxidation reaction of a parent metal with an oxidant to form a polycrystalline material. In conducting the process, a body of the parent metal and a permeable filler are oriented relative to each other so that formation of the oxidation reaction product will occur in a direction toward and into the filler. The parent metal is described as being present as a first source and as a reservoir, the reservoir of metal communicating with the first source due to, for example, gravity flow. The first source of molten parent metal reacts with the oxidant to begin the formation of the oxidation reaction product. As the first source of molten parent metal is consumed, it is replenished, preferably by a continuous means, from the reservoir of parent metal as the oxidation reaction product continues to be produced and infiltrates the filler. Thus, the reservoir assures that ample parent metal will be available to continue the process until the oxidation reaction product has grown to a desired extent.

A method for tailoring the constituency of the metallic component of a ceramic matrix composite structure is disclosed in Commonly Owned U.S. Pat. No. 5,017,533, which issued on May 21, 1991, which is a continuation of U.S. patent application Ser. No. 06/908,454, filed Sep. 17, 1986 (and now abandoned), a European counterpart to which was published in the EPO on Apr. 6, 1988, as Publication No. 0 263 051, both of which are in the names of Marc S. Newkirk et al., and entitled "Method for In Situ Tailoring the Metallic Component of Ceramic Articles and Articles Made Thereby".

Moreover, U.S. patent application Ser. No. 07/269,152, filed Nov. 9, 1988, which is a continuation of U.S. patent application Ser. No. 07/152,518, (which issued as U.S. Pat. No. 4,818,734, issued Apr. 4, 1989), in the names of Robert C. Kantner et al., which was a Continuation-in-Part Application of the above-mentioned Ser. No. 06/908,454, having the same title and also being Commonly Owned. This patent and the above-mentioned application 06/908,454, disclose methods for tailoring the constituency of the metallic component (both isolated and interconnected) of ceramic and ceramic matrix composite bodies during formation thereof to impart one or more desirable characteristics to the resulting body. Thus, desired performance characteristics for the ceramic or ceramic composite body are advantageously achieved by incorporating the desired metallic component in situ, rather than from an extrinsic source, or by post-forming techniques.

As discussed in these Commonly Owned Ceramic Matrix Patent Applications and Patents, novel polycrystalline ceramic materials or polycrystalline ceramic composite materials are produced by the oxidation reaction between a parent metal and an oxidant (e.g., a solid, liquid and/or a gas). In accordance with the generic process disclosed in these Commonly Owned Ceramic Matrix Patent Applications and Patents, a parent metal (e.g., aluminum) is heated to an elevated temperature above its melting point but below the melting point of the oxidation reaction product to form a body of molten parent metal which reacts upon contact with an oxidant to form the oxidation reaction product. At this temperature, the oxidation reaction product, or at least a portion thereof, is in contact with and extends between the body of molten parent metal and the oxidant, and molten metal is drawn or transported through the formed oxidation reaction product and towards the oxidant. The transported molten metal forms additional fresh oxidation reaction product upon contact with the oxidant, at the surface of previously formed oxidation reaction product. As the process continues, additional metal is transported through this formation of polycrystalline oxidation reaction product thereby continually "growing" a ceramic structure of interconnected crystallites. The resulting ceramic body may contain metallic constituents, such as non-oxidized constituents of the parent metal, and/or voids. Oxidation is used in its broad sense in all of the Commonly Owned Ceramic Matrix Patent Applications and Patents and in this application, and refers to the loss or sharing of electrons by a metal to an oxidant which may be one or more elements and/or compounds. Accordingly, elements other than oxygen may serve as an oxidant.

In certain cases, the parent metal may require the presence of one or more dopants in order to influence favorably or to facilitate growth of the oxidation reaction product. Such dopants may at least partially alloy with the parent metal at some point during or prior to growth of the oxidation reaction product. For example, in the case of aluminum as the parent metal and air as the oxidant, dopants such as magnesium and silicon, to name but two of a larger class of dopant materials, can be alloyed with aluminum, and the created growth alloy is utilized as the parent metal. The resulting oxidation reaction product of such a growth alloy, in the case of using oxygen as an oxidant, comprises alumina, typically alpha-alumina.

Novel ceramic composite structures and methods of making the same are also disclosed and claimed in certain of the aforesaid Commonly Owned Ceramic Matrix Patent Applications and Patents which utilize the oxidation reaction to produce ceramic composite structures comprising a substantially inert filler (note: in some cases it may be desirable to use a reactive filler, e.g., a filler which is at least partially reactive with the advancing oxidation reaction product and/or parent metal) infiltrated by the polycrystalline ceramic matrix. A parent metal is positioned adjacent to a mass of permeable filler (or a preform) which can be shaped and treated to be self-supporting, and is then heated to form a body of molten parent metal which is reacted with an oxidant, as described above, to form an oxidation reaction product. As the oxidation reaction product grows and infiltrates the adjacent filler material, molten parent metal is drawn through previously formed oxidation reaction product within the mass of filler and reacts with the oxidant to form additional fresh oxidation reaction product at the surface of the previously formed oxidation reaction product, as described above. The resulting growth of oxidation reaction product infiltrates or embeds the filler and results in the formation of a ceramic composite structure of a polycrystalline ceramic matrix embedding the filler. As also discussed above, the filler (or preform) may utilize a barrier means to establish a boundary or surface for the ceramic composite structure.

Thus, the aforesaid Commonly Owned Ceramic Matrix Patent Applications and Patents describe the production of oxidation reaction products which are readily grown to desired sizes and thicknesses heretofore believed to be difficult, if not impossible, to achieve with conventional ceramic processing techniques.

The production of boride-containing materials has been addressed in commonly owned U.S. Pat. No. 4,885,130 (hereinafter "U.S. Pat. No. '130"), which issued Dec. 5, 1989, in the names of Danny R. White, Michael K. Aghajanian and T. Dennis Claar and is entitled "Process for Preparing Self-Supporting Bodies and Products Made Thereby", a European counterpart to which was published in the EPO on Jul. 18, 1990, as Publication No. 0 378 499.

Briefly summarizing the disclosure of U.S. Pat. No. '130, self-supporting ceramic bodies are produced by utilizing a parent metal infiltration and reaction process (i.e., reactive infiltration) in the presence of a mass comprising boron carbide. Particularly, a bed or mass comprising boron carbide and, optionally, one or more of a boron donor material and a carbon donor material is infiltrated by molten parent metal, and the bed may be comprised entirely of boron carbide or only partially of boron carbide, thus resulting in a self-supporting body comprising, at least in part, one or more parent metal boron-containing compounds, which compounds include a parent metal boride or a parent metal boro carbide, or both, and typically also may include a parent metal carbide. It is also disclosed that the mass comprising boron carbide which is to be infiltrated may also contain one or more inert fillers mixed with the boron carbide. Accordingly, by combining an inert filler, the result will be a composite body having a matrix produced by the reactive infiltration of the parent metal, said matrix comprising at least one boron-containing compound, and the matrix may also include a parent metal carbide, the matrix embedding the inert filler. It is further noted that the final composite body product in either of the above-discussed embodiments (i.e., filler or no filler) may include a residual metal as at least one metallic constituent of the original parent metal.

Broadly, in the disclosed method of U.S. Pat. No. '130, a mass comprising boron carbide and, optionally, one or more of a boron donor material and a carbon donor material, is placed adjacent to or in contact with a body of molten metal or metal alloy, which is melted in a substantially inert environment within a particular temperature envelope. The molten metal infiltrates the mass comprising boron carbide and reacts with at least the boron carbide to form at least one reaction product. The boron carbide and/or the boron donor material and/or the carbon donor material is reducible, at least in part, by the molten parent metal, thereby forming the parent metal boron-containing compound (e.g., a parent metal boride and/or boro compound under the temperature conditions of the process). Typically, a parent metal carbide is also produced, and in certain cases, a parent metal boro carbide is produced. At least a portion of the reaction product is maintained in contact with the metal, and molten metal is drawn or transported toward the unreacted mass comprising boron carbide by a wicking or a capillary action. This transported metal forms additional parent metal, boride, carbide, and/or boro carbide and the formation or development of a ceramic body is continued until either the parent metal or mass comprising boron carbide has been consumed, or until the reaction temperature is altered to be outside of the reaction temperature envelope. The resulting structure comprises one or more of a parent metal boride, a parent metal boro compound, a parent metal carbide, a metal (which, as discussed in U.S. Pat. No. '130, is intended to include alloys and intermetallics), or voids, or any combination thereof. Moreover, these several phases may or may not be interconnected in one or more dimensions throughout the body. The final volume fractions of the boron-containing compounds (i.e., boride and boron compounds), carbon-containing compounds, and metallic phases, and the degree of interconnectivity, can be controlled by changing one or more conditions, such as the initial density of the mass comprising boron carbide, the relative amounts of boron carbide and parent metal, alloys of the parent metal, dilution of the boron carbide with a filler, the amount of boron donor material and/or carbon donor material mixed with the mass comprising boron carbide, temperature, and time. Preferably, conversion of the boron carbide to the parent metal boride, parent metal boro compound(s) and parent metal carbide is at least about 50%, and most preferably at least about 90%.

The typical environment or atmosphere which was utilized in U.S. Pat. No. '130 was one which is relatively inert or unreactive under the process conditions. Particularly, it was disclosed that an argon gas, or a vacuum, for example, would be suitable process atmospheres. Still further, it was disclosed that when zirconium was used as the parent metal, the resulting composite comprised zirconium diboride, zirconium carbide, and residual zirconium metal. It was also disclosed that when aluminum parent metal was used with the process, the result was an aluminum boro carbide such as $Al_3B_{48}C_2$, $AlB_{12}C_2$ and/or $AlB_{24}C_4$, with aluminum parent metal and other unreacted unoxidized constituents of the parent metal remaining. Other parent metals which were disclosed as being suitable for use with the processing conditions included silicon, titanium, hafnium, lanthanum, iron, calcium, vanadium, niobium, magnesium, and beryllium.

Still further, it is disclosed that by adding a carbon donor material (e.g., graphite powder or carbon black) and/or a boron donor material (e.g., a boron powder, silicon borides, nickel borides and iron borides) to the mass of boron carbide, the ratio or parent metal-boride/parent metal-carbide can be adjusted. For example, if zirconium is used as the parent metal, the ratio of $ZrB_2/ZrC$ can be reduced if a carbon donor material is utilized (i.e., more ZrC is produced out to the addition of a carbon donor material in the mass of boron carbide) while if a boron donor material is utilized, the ratio of $ZrB_2/Zrc$ can be increased (i.e., more $ZrB_2$ is produced due to the addition of a boron donor material in the mass of boron carbide). Still further, the relative size of $ZrB_2$ platelets which are formed in the body may be larger than platelets that are formed by a similar process without the use of a boron donor material. Thus, the addition of a carbon donor material and/or a boron donor material may also effect the morphology of the resultant material.

In another related patent, specifically, U.S. patent application No. 4,915,736 (hereinafter referred to as "U.S. Pat. No. '736"), issued in the names of Terry Dennis Claar and Gerhard Hans Schiroky, on Apr. 10, 1990, and entitled "A Method of Modifying Ceramic Composite Bodies By a Carburization Process and Articles Made Thereby", a European counterpart to which was published in the EPO on Jun. 28, 1989, as Publication No. 0 322 346 additional modification techniques are disclosed. Specifically, U.S. Pat. No. '736 discloses that a ceramic composite body made in accordance with the teachings of, for example, U.S. Pat. No. '130 can be modified by exposing the composite to a gaseous carburizing species. Such a gaseous carburizing species can be produced by, for example, embedding the composite body in a graphitic bedding and reacting at least a portion of the graphitic bedding with moisture or oxygen in a controlled atmosphere furnace. However, the furnace atmosphere should comprise typically, primarily, a non-reactive gas such as argon. It is not clear whether impurities present in the argon gas supply the necessary $O_2$ for forming a carburizing species, or whether the argon gas merely serves as a vehicle which contains impurities generated by some type of volatilization of components in the graphitic bedding or in the composite body. In addition, a gaseous carburizing species could be introduced directly into a controlled atmosphere furnace during heating of the composite body.

Once the gaseous carburizing species has been introduced into the controlled atmosphere furnace, the setup should be designed in such a manner to permit the carburizing species to be able to contact at least a portion of the surface of the composite body buried in the loosely packed graphitic powder. It is believed that carbon in the carburizing species, or carbon from the graphitic bedding, will dissolve into the interconnected zirconium carbide phase, which can then transport the dissolved carbon throughout substantially all of the composite body, if desired, by a vacancy diffusion process. Moreover, U.S. Pat. No. '736 discloses that by controlling the time, the exposure of the composite body to the carburizing species and/or the temperature at which the carburization process occurs, a carburized zone or layer can be formed on the surface of the composite body. Such process could result in a hard, wear-resistant surface surrounding a core of composite material having a higher metal content and higher fracture toughness.

Thus, if a composite body was formed having a residual parent metal phase in the amount of between about 5–30 volume percent, such composite body could be modified by a post-carburization treatment to result in from about 0 to about 2 volume percent, typically about ½ to about 2 volume percent, of parent metal remaining in the composite body.

Still further, U.S. Pat. No. 5,143,870, which issued on Sep. 1, 1992, is a continuation-in-part of U.S. patent application Ser. No. 07/296,239, filed on Jan. 12, 1989, which is a continuation-in-part application of Patent '736, discloses that in addition to a carburizing species, a nitriding and/or boriding species may also be utilized to result in similar modifications to the formed composite bodies.

A novel method of making a metal matrix composite material is disclosed in Commonly Owned U.S. Pat. No. 4,828,008, issued May 9, 1989, in the names of White et al., and entitled "Metal Matrix Composites", a European counterpart to which was published in the EPO on Nov. 17, 1988, as Publication No. 0 291 441. According to the method of the White et al. invention, a metal matrix composite is produced by infiltrating a permeable mass of filler material (e.g., a ceramic or a ceramic-coated material) with molten aluminum containing at least about 1 percent by weight magnesium, and preferably at least about 3 percent by weight magnesium. Infiltration occurs spontaneously without the application of external pressure or vacuum. A supply of the molten metal alloy is contacted with the mass of filler material at a temperature of at least about 675° C. in the presence of a gas comprising from about 10 to 100 percent, and preferably at least about 50 percent, nitrogen by volume, and a remainder of the gas, if any, being a nonoxidizing gas, e.g., argon. Under these conditions, the molten aluminum alloy infiltrates the ceramic mass under normal atmospheric pressures to form an aluminum (or aluminum alloy) matrix composite. When the desired amount of filler material has been infiltrated with the molten aluminum alloy, the temperature is lowered to solidify the alloy, thereby forming a solid metal matrix structure that embeds the reinforcing filler material. Usually, and preferably, the supply of molten alloy delivered will be sufficient to permit the infiltration to proceed essentially to the boundaries of the mass of filler material. The amount of filler material in the aluminum matrix composites produced according to the White et al. invention may be exceedingly high. In this respect, filler to alloy volumetric ratios of greater than 1:1 may be achieved.

Under the process conditions in the aforesaid White et al. invention, aluminum nitride can form as a discontinuous phase dispersed throughout the aluminum matrix. The amount of nitride in the aluminum matrix may vary depending on such factors as temperature, alloy composition, gas composition and filler material. Thus, by controlling one or more such factors in the system, it is possible to tailor certain properties of the composite. For some end use applications, however, it may be desirable that the composite contain little or substantially no aluminum nitride.

It has been observed that higher temperatures favor infiltration but render the process more conducive to nitride formation. The White et al. invention allows the choice of a balance between infiltration kinetics and nitride formation.

An example of suitable barrier means for use with metal matrix composite formation is described in Commonly Owned U.S. Pat. No. 4,935,055, issued Jun. 19, 1990, in the names of Michael K. Aghajanian et al., and entitled "Method of Making Metal Matrix Composite with the Use of a Barrier", a European counterpart to which was published in the EPO on Jul. 12, 1989, as Publication No. 0 323 945. According to the method of this Aghajanian et al. invention, a barrier means (e.g., particulate titanium diboride or a graphite material such as a flexible graphite tape product sold by Union Carbide under the trade name GRAFOIL®) is disposed on a defined surface boundary of a filler material and matrix alloy infiltrates up to the boundary defined by the barrier means. The barrier means is used to inhibit, prevent, or terminate infiltration of the molten alloy, thereby providing net, or near net, shapes in the resultant metal matrix composite. Accordingly, the formed metal matrix composite bodies have an outer shape which substantially corresponds to the inner shape of the barrier means.

The method of U.S. Pat. No. 4,828,008, was improved upon by Commonly Owned and Copending U.S. patent application Ser. No. 07/759,745, filed Sep. 12, 1991, which is a continuation of U.S. patent application Ser. No. 07/517,541, filed Apr. 24, 1990, now abandoned, which is a continuation of U.S. patent application Ser. No. 07/168,284, filed Mar. 15, 1988 (and now abandoned), both in the names of Michael K. Aghajanian and Marc S. Newkirk and entitled "Metal Matrix Composites and Techniques for Making the Same", a European counterpart to which was published in the EPO on Sep. 20, 1989, as Publication No. 0 333 692. In accordance with the methods disclosed in this U.S. patent application, a matrix metal alloy is present as a first source of metal and as a reservoir of matrix metal alloy which communicates with the first source of molten metal due to, for example, gravity flow. Particularly, under the conditions described in this patent application, the first source of molten matrix alloy begins to infiltrate the mass of filler material under normal atmospheric pressures and thus begins the formation of a metal matrix composite. The first source of molten matrix metal alloy is consumed during its infiltration into the mass of filler material and, if desired, can be replenished, preferably by a continuous means, from the reservoir of molten matrix metal as the spontaneous infiltration continues. When a desired amount of permeable filler has been spontaneously infiltrated by the molten matrix alloy, the temperature is lowered to solidify the alloy, thereby forming a solid metal matrix structure that embeds the reinforcing filler material. It should be understood that the use of a reservoir of metal is simply one embodiment of the invention described in this patent application and it is not necessary to combine the reservoir embodiment with each of the alternate embodiments of the invention disclosed therein, some of which could also be beneficial to use in combination with the present invention.

The reservoir of metal can be present in an amount such that it provides for a sufficient amount of metal to infiltrate the permeable mass of filler material to a predetermined extent. Alternatively, an optional barrier means can contact the permeable mass of filler on at least one side thereof to define a surface boundary.

Moreover, while the supply of molten matrix alloy delivered should be at least sufficient to permit spontaneous infiltration to proceed essentially to the boundaries (e.g., barriers) of the permeable mass of filler material, the amount of alloy present in the reservoir could exceed such sufficient amount so that not only will there be a sufficient amount of alloy for complete infiltration, but excess molten metal alloy could remain and be attached to the metal matrix composite body. Thus, when excess molten alloy is present, the resulting body will be a complex composite body (e.g., a macrocomposite), wherein an infiltrated ceramic body having a metal matrix therein will be directly bonded to excess metal remaining in the reservoir.

Further improvements in metal matrix technology can be found in commonly owned and copending U.S. patent application Ser. No. 07/863,894, filed Apr. 6, 1992, which is a continuation of U.S. patent application Ser. No. 07/521, 043, filed May 9, 1990, now abandoned, which is a continuation-in-part of U.S. patent application Ser. No. 07/484, 753, filed Feb. 23, 1990, which is a continuation-in-part of U.S. patent application Ser. No. 07/432,661, filed Nov. 7, 1989, and now abandoned, which is a continuation-in-part of U.S. patent application Ser. No. 07/416,327, filed Oct. 6, 1989, and now abandoned, a European counterpart to which was published in the EPO on Jun. 27, 1990, as Publication No. 0 375 588, in the names of Aghajanian, et al. and entitled "A Method of Forming Metal Matrix Composite Bodies by a Spontaneous Infiltration Process, and Products Produced Therefrom". According to this Aghajanian, et al. invention, spontaneous infiltration of a matrix metal into a permeable mass of filler material or preform, at least at some point during the process, which permits molten matrix metal to spontaneously infiltrate the filler material or preform. Aghajanian, et al. disclose a number of matrix metal/infiltration enhancer precursor/infiltrating atmosphere systems which exhibit spontaneous infiltration. Specifically, Aghajanian, et al. disclose that spontaneous infiltration behavior has been observed in the aluminum/magnesium/nitrogen system; the aluminum/strontium/nitrogen system; the aluminum/zinc/oxygen system; and the aluminum/calcium/nitrogen system. However, it is clear from the disclosure set forth in the Aghajanian, et al. invention that the spontaneous infiltration behavior should occur in other matrix metal/infiltration enhancer precursor/infiltrating atmosphere systems.

A novel method of forming a metal matrix composite by infiltration of a permeable mass of filler contained in a ceramic matrix composite mold is disclosed in Commonly Owned U.S. Pat. No. 4,871,008, issued Oct. 3, 1989, which issued from U.S. patent application Ser. No. 07/142,385, filed Jan. 11, 1988, by Dwivedi et al., both entitled "Method of Making Metal Matrix Composites", a European counterpart to which was published in the EPO on Jul. 19, 1989, as Publication No. 0 324 706. According to the method of the Dwivedi et al. invention, a mold is formed by the directed oxidation of a molten precursor metal or parent metal with an oxidant to develop or grow a polycrystalline oxidation reaction product which embeds at least a portion of a preform comprised of a suitable filler (referred to as a "first filler"). The formed mold of ceramic matrix composite is then provided with a second filler and the second filler and mold are contacted with molten metal, and the mold contents are hermetically sealed, most typically by introducing at least one molten metal into the entry or opening which seals the mold. The hermetically sealed bedding may contain entrapped air, but the entrapped air and the mold contents are isolated or sealed so as to exclude or shut-out the external or ambient air. By providing a hermetic environment, effective infiltration of the second filler at moderate molten metal temperatures is achieved, and therefore obviates or eliminates any necessity for wetting agents, special alloying ingredients in the molten matrix metal, applied mechanical pressure, applied vacuum, special gas atmospheres or other infiltration expedients.

The above-discussed commonly owned patent describes a method for the production of a metal matrix composite body, which may be bonded to a ceramic matrix composite body, and the novel bodies which are produced therefrom.

A method of forming metal matrix composite bodies by a self-generated vacuum process is disclosed in Commonly Owned and Copending U.S. patent application Ser. No. 07/888,241, filed on May 22, 1992, which is a continuation of U.S. application Ser. No. 07/381,523, filed on Jul. 18, 1989, and now abandoned, in the names of Robert C. Kantner et al., and entitled "A Method of Forming Metal Matrix Composite Bodies by a Self-Generated Vacuum Process and Products Produced Therefrom", a European counterpart to which was published in the EPO on Jan. 23, 1991, as Publication No. 0 409 763 A2. These patent applications disclose a method whereby a molten matrix metal is contacted with a filler material or a preform in the presence of a reactive atmosphere, and, at least at some point during the process, the molten matrix metal reacts, either partially or substantially completely, with the reactive atmosphere, thereby causing the molten matrix metal to infiltrate the filler material or preform due to, at least in part, the creation of a self-generated vacuum. Such self-generated vacuum infiltration occurs without the application of any external pressure or vacuum.

A method for forming polymer matrix composite bodies is disclosed in commonly owned and copending U.S. application Ser. No. 07/932,903, filed on Aug. 20, 1992, which is a continuation of U.S. application Ser. No. 07/690,134, filed on Apr. 23, 1991, and now abandoned, in the names of Christopher M. Looby et al., and entitled "Polymer Matrix Composite Bodies and Methods For Making the Same", a foreign counterpart to which was published on Oct. 29, 1992, as International Publication No. WO 92/18327. These patent applications disclose a method whereby an appropriate filler material is caused to be placed within a particular polymer material, whereby the polymer material functions as a matrix and the filler material synergistically interacts with the polymer to form a novel polymer matrix composite body. Moreover, the application discloses that by combining specific polymer matrix materials with specific filler or reinforcing materials, very desirable wear parts can be fabricated.

The entire disclosures of all of the foregoing commonly owned patent applications and Patents are expressly incorporated herein by reference.

SUMMARY OF THE INVENTION

The present invention relates to novel combinations of materials and methods for making the same. More particularly, the bodies of the present invention comprise ceramics, ceramic matrix composites or metal matrix composites having attached or bonded to at least one surface thereof a polymer-based material. The polymer-based material may enhance certain properties of the ceramic, ceramic matrix composite or metal matrix composite or it may render a body more applicable to use in conjunction with other materials as opposed to using a ceramic, ceramic matrix composite or metal matrix composite by itself. For example, it may be desirable to use a ceramic, ceramic matrix composite or metal matrix composite in conjunction with, for example, a metal material. However, during certain applications, the ceramic, ceramic matrix composite or metal matrix composite may not be particularly well suited for use in conjunction with the metal material. For instance, if two materials were to be used together (e.g., a ceramic material used in conjunction with a metal material) and the two materials had different coefficients of thermal expansion and the two materials are subjected to thermal energy, the material with the larger coefficient of thermal expansion (e.g., the metal) will generally expand at a greater rate than the material with the lower coefficient of thermal expansion (e.g., the ceramic material). If the ceramic material encases the metal, then the ceramic material may be subjected to tensile stress which may be sufficient to cause the ceramic material to fracture and/or fail catastrophically. However, in this particular embodiment, if a polymer-based material was placed at an interface between the ceramic and the metal, then the polymer-based material could function to ameliorate stresses generated by the expanding metal (e.g., the polymer-based material may function as a compliant layer).

A preferred embodiment of the present invention relates to novel shaft sleeves and methods for producing the same. More particularly, the novel shaft sleeves of the instant invention comprise a material of high erosion and/or corrosion resistance which functions as a shaft sleeve and which is contacted with, on at least a portion of its inner surface, a compliant material (e.g., a polymer-based material) which can ameliorate any stresses generated between the two materials (e.g., when the metal shaft of a pump expands at a greater rate than the sleeve material due to, for example, differing CTEs between the materials).

In a preferred embodiment of the instant invention, the shaft sleeve material comprises a ceramic or ceramic matrix composite body which includes one or more oxidation reaction products, which bodies may be formed in accordance with one or more methods of the commonly owned patent applications and patents discussed above.

In a first embodiment, a ceramic or ceramic matrix composite body (i.e., with one or more fillers) is formed, as discussed above, in the shape of the desired shaft sleeve, except that the inner diameter of the shaft sleeve is slightly larger than would be necessary to provide the shaft sleeve with a snug fit over a, for example, metal shaft. After forming the ceramic matrix composite shaft sleeve, the inner surface of the shaft sleeve is provided with a full or partial covering of a material comprising one or more compliant-type material(s) (e.g., a polymer, a polymer matrix composite, polyurethane, rubber, plastic, etc., or a combination thereof). After placing the compliant material on at least a portion of the inner surface of the sleeve, the inner surface or annulus of the ceramic shaft sleeve can be readily machined to tight tolerances, as compared to machining an inner surface comprised completely of a ceramic material. Judicious selection of compliant materials (e.g., interface materials) can result in relatively easy machining of the compliant material, yet permit necessary tight tolerances needed in the pump application. Alternatively, rather then providing a compliant material on the shaft sleeve, the compliant material could be applied directly to the metal shaft and then be processed in a similar manner. Still further, the compliant material could be placed on both of the shaft and the shaft sleeve in a complementary manner.

After machining the compliant material, the shaft sleeve can be fit over the metal shaft of the pump and when the pump shaft turns, friction, and thus heat, is generated due to the ceramic shaft sleeve turning against the packing material contained in the stuffing box. Typically, the metal shaft expands at a greater rate than the ceramic matrix composite shaft sleeve resulting in undesirable stresses in the shaft/shaft sleeve combination. However, the compliant interface material ameliorates undesirable stresses generated from the faster expanding metal shaft. Thus, the ceramic matrix composite shaft sleeve is protected from premature cracking and/or catastrophic failure.

In another preferred embodiment, the ceramic shaft sleeve is produced according to any traditional ceramic processing method (e.g., sintering, hot pressing, etc.). However, after formation of the ceramic shaft sleeve, the compliant interface material can be placed onto at least a portion of the inner surface of the ceramic shaft sleeve and/or onto at least a portion of the outer surface of the shaft, as discussed above.

In still another preferred embodiment, the shaft sleeve comprises a metal matrix composite body, which may be formed in accordance with one of the methods of the commonly owned U.S. patent applications and U.S. patents discussed above, or it may be produced according to any traditional method of forming metal matrix composite bodies. After forming a metal matrix composite body in the shape of a shaft sleeve, the compliant interface material can be provided onto at least a portion of the inner surface of the metal matrix composite shaft sleeve and/or onto at least a portion of the outer surface of the shaft in a manner similar to the methods described above for ceramic and ceramic matrix composite shaft sleeves.

Another specific example of an application which would benefit from the combination of materials of the instant invention would be hydrocyclone separators. More specifically, the apex of a hydrocyclone separator is subjected to a highly abrasive environment. Therefore, it may be desirable to incorporate a ceramic, ceramic matrix composite or metal matrix composite to withstand such an abrasive environment. While the inner diameter of a ceramic, ceramic matrix composite or metal matrix composite apex may be well suited for the intended purpose, the outer surface of the apex may be easily damaged during, for example, installation or shipping as well as during certain end use applications.

DETAILED DESCRIPTION OF THE INVENTION AND PREFERRED EMBODIMENTS

Figure 1:
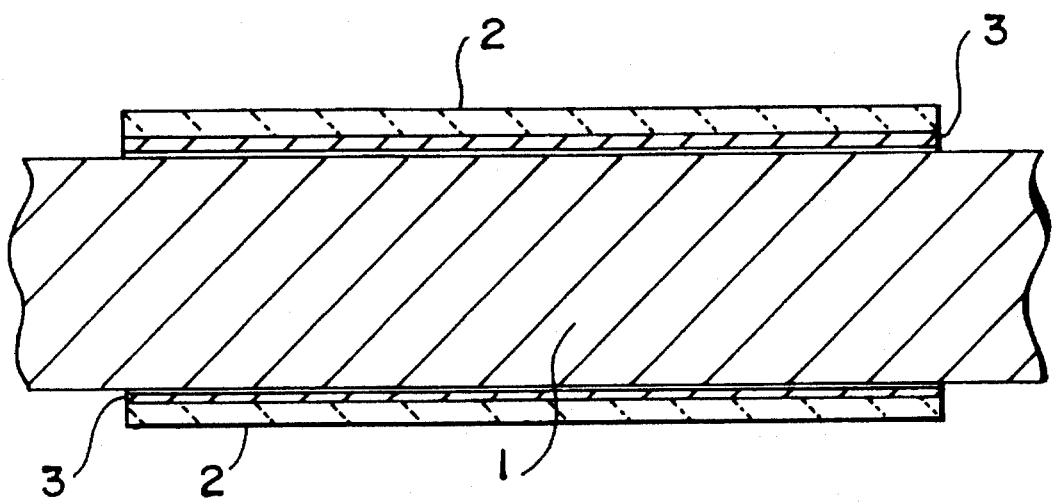
FIG. 1 is a schematic view of a cross section of a shaft sleeve of the present invention.

The present invention relates to a novel combination of materials (e.g., macrocomposite bodies) and methods for making the same. More particularly, the bodies of the present invention comprise ceramics, ceramic matrix composites or metal matrix composites which are contacted with, on at least one surface thereof, a polymer-based material. The polymer-based material may enhance certain properties of the ceramic, ceramic matrix composite or metal matrix composite or it may render a body more applicable to use in conjunction with other materials as opposed to using a ceramic, ceramic matrix composite or metal matrix composite by itself. For example, it may be desirable to use a ceramic, ceramic matrix composite or metal matrix composite in conjunction with, for example, a metal material. However, during certain applications, the ceramic, ceramic matrix composite or metal matrix composite may not be particularly well suited for use in conjunction with the metal material. For instance, if two materials were to be used together (e.g., a ceramic material used in conjunction with a metal material) and the two materials had different coefficients of thermal expansion and the two materials were subjected to thermal energy, the material with the larger coefficient of thermal expansion (e.g., the metal) will generally expand at a greater rate than the material with the lower coefficient of thermal expansion (e.g., the ceramic material). If the ceramic material encases the metal, then the ceramic material may be subjected to tensile stress which may be sufficient to cause the ceramic material to fracture and/or fail catastrophically. However, in this particular embodiment, if a polymer-based material was placed at an interface between the ceramic and the metal, then the polymer-based material could function to ameliorate stresses generated by the expanding metal (e.g., the polymer-based material may function as a compliant layer).

A preferred embodiment of the present invention relates to novel shaft sleeves and methods for producing the same. More particularly, the novel shaft sleeves of the instant invention comprise a material of high erosion and/or corrosion resistance which functions as a shaft sleeve and is contacted with, on at least a portion of its inner surface, a compliant material (e.g., a polymer-based material) which can ameliorate various stresses generated between the two materials (e.g., when the metal shaft of a pump expands at a greater rate than the sleeve material due to differing CTEs between the materials).

The compliant material of the instant invention should be capable of bonding to the shaft sleeve and/or the shaft material. Moreover, the compliant material should have an elastic modulus and hardness at room temperature to provide for easy machining and the ability to maintain tight tolerances needed in the particular end use application; however, the compliant material should have a modulus which typically decreases and an elasticity that typically increases as the temperature of the material increases, which tends to result in a compression of the compliant material and absorption of any thermal expansion of the shaft, without transferring sufficient stress to the sleeve which normally might result in failure thereof. Furthermore, it may be desirable to choose a compliant material which can be cast by conventional techniques at or near room temperature and which is capable of flowing into fairly narrow spaces. Materials suitable for use as compliant materials include polymers, polymer matrix composites, polyurethane, rubbers, plastics, etc., and various combinations thereof.

An attendant advantage of the use of a compliant material on the inner diameter of a shaft sleeve and/or on the outer diameter of a shaft material is the relative ease of machining of the compliant material as compared to, for example, a ceramic matrix composite material which, without the use of the compliant material, would need to be machined using diamond tooling to tight tolerances in order to fit snugly onto the shaft of the pump. By utilizing a compliant and readily machinable material on an inner surface or inner annulus of the wear resistant shaft sleeve (i.e., at an interface between the two materials), there is a reduced need to machine the wear resistant material, rather, the primary material which is machined is the compliant material. Thus, the present invention results in an increased savings in both time and money when producing a shaft sleeve with the necessary tight tolerances to fit snugly over the shaft of a pump.

In a preferred embodiment of the instant invention, the shaft sleeve material comprises a ceramic or ceramic matrix composite body which includes one or more oxidation reaction products, which bodies may be formed in accordance with one or more methods of the commonly owned patent applications and patents discussed above.

In a first embodiment, a ceramic or ceramic matrix composite body (i.e., with one or more filler materials) is formed, as discussed above, in the shape of the desired shaft sleeve, except that the inner diameter of the shaft sleeve is slightly larger than would be necessary to provide the shaft sleeve with a snug fit over a, for example, metal shaft. After forming the ceramic matrix composite shaft sleeve, the inner surface of the shaft sleeve is provided with a full or partial covering of a material comprising one or more compliant-type material(s) (e.g., a polymer, a polymer matrix composite, polyurethane, rubber, plastic, etc., or combinations thereof). The compliant interface material may be provided by, for example, first standing the shaft sleeve on one end and placing a mandrel, which has a diameter of slightly less than the diameter of a pump shaft which the sleeve will ultimately fit over, into the center of the sleeve. The inner diameter of the sleeve onto which it is desirable to place the compliant material should first be treated in any suitable manner so that the compliant material will bond well to the desired area of the sleeve material. Moreover, an outer surface of the mandrel could be provided with a releasing agent to prevent bonding of the compliant material thereto. After treating the materials as desired, the compliant material can be poured (e.g., by using a pourable polyurethane, polymer or polymer matrix composite material, or in a preferred embodiment, precursors of such materials) into the space between the inner surface of the sleeve and the outer surface of the mandrel.

After the compliant material has cured, the mandrel may be removed. The inner surface or annulus of the ceramic shaft sleeve can be readily machined to tight tolerances using conventional low cost machining techniques, as compared to diamond machining an inner surface comprised completely of a ceramic material, which typically involves much higher costs and/or machining time. Judicious selection of compliant materials to function at the interface can result in easy machining of the compliant material, yet permit necessary tight tolerances needed in the pump application. Alternatively, rather than pouring a compliant material (or precursor thereof) on the shaft sleeve, the compliant material could be applied directly to the metal shaft and then be processed in a similar manner.

After machining the compliant material, the shaft sleeve can be fit over the metal shaft of the pump and when the pump shaft turns, friction, and thus heat, is generated due to the ceramic shaft sleeve turning against the packing material contained in the stuffing box of the pump. Typically, the metal shaft expands at a greater rate than the ceramic matrix composite shaft sleeve, resulting in undesirable stresses in the shaft/shaft sleeve combination. However, the compliant interface material ameliorates undesirable stresses generated from the faster expanding metal shaft. Thus, the ceramic matrix composite shaft sleeve is protected from premature cracking and/or failure.

In another preferred embodiment, the ceramic shaft sleeve is produced according to any traditional ceramic processing method (e.g., sintering, hot pressing, etc.). However, after formation of the ceramic shaft sleeve, the compliant interface material can be placed onto at least a portion of the inner surface of the ceramic shaft sleeve and/or onto at least a portion of the outer surface of the shaft, as discussed above.

In still another preferred embodiment, the shaft sleeve comprises a metal matrix composite body, which may be formed in accordance with one of the methods of the commonly owned U.S. patent applications and U.S. patents discussed above, or it may be produced according to any traditional method of forming metal matrix composite bodies. After forming a metal matrix composite body in the shape of a shaft sleeve, the compliant interface material can provided onto at least a portion of the inner surface of the metal matrix composite shaft sleeve and/or onto at least a portion of the outer surface of the shaft in a manner similar to the methods described above for a ceramic and ceramic matrix composite shaft sleeve.

The compliant interface material may be disposed on substantially the entire inner surface of the sleeve and/or the entire outer surface of the shaft and combinations thereof (e.g., a portion of the compliant interface material may be placed on an inner surface of the shaft sleeve and a complimentary portion may be placed onto an outer surface of the shaft); however, in one preferred embodiment, the compliant interface material is provided on the inner surface of the shaft sleeve in the configuration of rings (e.g., the compliant interface material may be disposed onto only a short section adjacent each longitudinal end of the shaft sleeve). Accordingly, a central portion of the inner surface is not provided with a compliant interface material and, therefore, does not contact the shaft when the sleeve is placed over the shaft. For example, plastic discs (or any other suitable material, such as Teflon®) may be formed with a diameter substantially equal to the inner diameter of a shaft sleeve. The center of the disc could be machined to produce a hole having a diameter substantially equal to the diameter of a pump shaft. Thereafter, one disc could be press fit into each end of the shaft sleeve and, if necessary, bonded to the shaft sleeve material using, for example, an epoxy or other adhesive.

Moreover, the compliant interface material may be any suitable polymer, polyurethane, rubber, plastic, or the like as long as the compliant material has the characteristics stated above. Furthermore, it may be desirable to use a polymer matrix composite, which may be formed in accordance with the method of commonly owned U.S. patent application Ser. No. 07/932,903, discussed above. The use of a polymer matrix composite interface material may be particularly attractive when it is desirable to alter the CTE of the compliant material by, for example, selecting certain compositions, grain size(s) and/or amounts of filler to be used with the polymer matrix. However, it is not necessary to form the polymer matrix composite according to the method of commonly owned U.S. patent application Ser. No. 07/932,903. Specifically, any suitable method of forming a polymer matrix composite may be used when it is desirable to alter the CTE of the compliant material by, for example, selecting certain compositions, grain size(s) and/or amounts of filler to be used with the polymer matrix. For example, it may be desirable to use a method whereby the polymer matrix embeds a relatively minor amount of filler material, or a relatively large amount of filler material, whereby such composite is formed by simple mixing techniques.

Particularly preferred embodiments of the shaft sleeve embodiment of the present invention are set forth in the following figures wherein:

FIG. 1 is a schematic view of a cross section of a pump shaft 1 having a shaft sleeve 2 placed thereon. A compliant material 3 is placed between the inner diameter of the shaft sleeve 2 and the pump shaft 1. Moreover, the compliant material 3 is bonded to substantially the entire inner diameter of the shaft sleeve 2.

Figure 2:
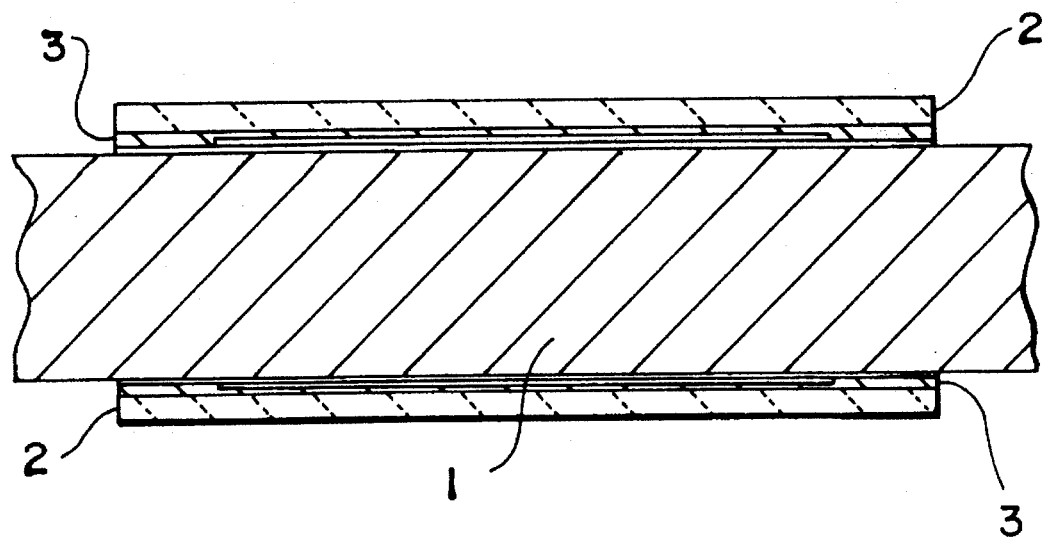
FIG. 2 is a schematic view of a cross section of an alternative embodiment of the shaft sleeve of the present invention.

FIG. 2 shows a schematic view of a cross section of a pump shaft 1 having thereon a shaft sleeve 2 which has a compliant material 3 disposed on substantially its entire inner diameter. However, the compliant material 3 is in contact with the pump shaft 1 at only the very edges of the shaft sleeve 2.

Figure 3:
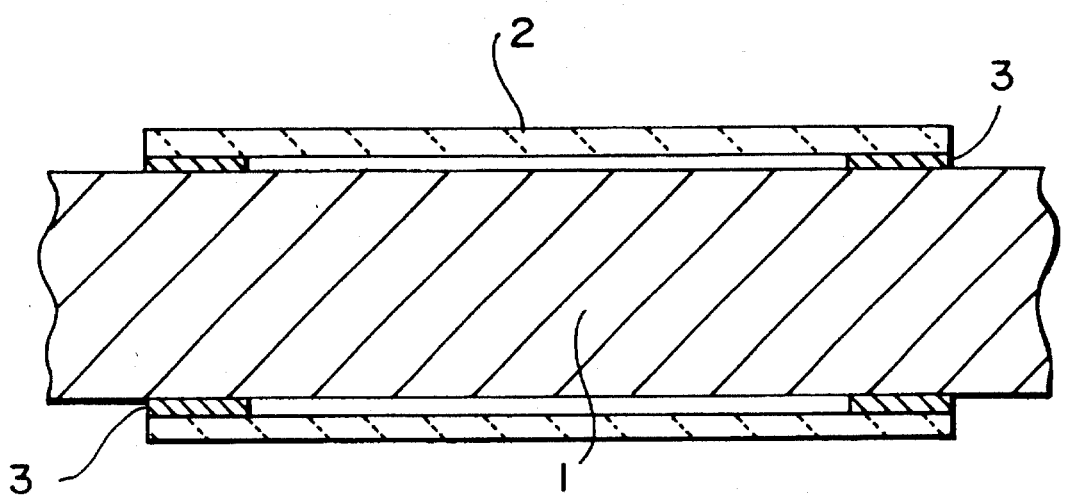
FIG. 3 is a schematic view of a cross section of an alternative embodiment of the shaft sleeve of the present invention.

FIG. 3 is a schematic cross section of a pump shaft 1 having thereon a shaft sleeve 2 wherein a compliant material is provided in the form of rings at both ends of the shaft sleeve 2. The center portion of the inner diameter of the shaft sleeve 2 is not provided with a compliant interface material.

Figure 4:
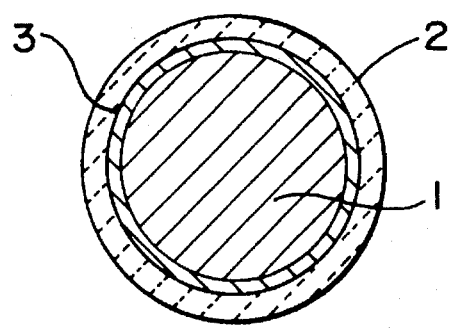
FIG. 4 is a schematic view of a cross section of the shaft sleeve of the present invention.

FIG. 4 is a schematic cross section of a pump shaft 1 having a shaft sleeve 2 placed thereon. A compliant material 3 is bonded to the inner diameter of the shaft sleeve 2.

Another specific example of an application which would benefit from the materials of the instant invention would be hydrocyclone separators. More specifically, the apex of a hydrocyclone separator is typically subjected to a highly erosive and/or corrosive environment. Therefore, it may be desirable to incorporate a ceramic, ceramic matrix composite or metal matrix composite to withstand such an environment. While the inner surface of a ceramic, ceramic matrix composite or metal matrix composite apex which is subjected to the erosive and/or corrosive environment may be well suited for its intended purpose, the outer surface of the apex may be easily damaged during, for example, installation or shipping, as well as during certain end use applications.

Furthermore, an apex is generally inserted into a steel housing and may be attached thereto utilizing, for example, an epoxy and a mechanical type clamping ring. The steel housing is then bolted, or clamped, to the remainder of the hydrocyclone assembly.

Figure 7:
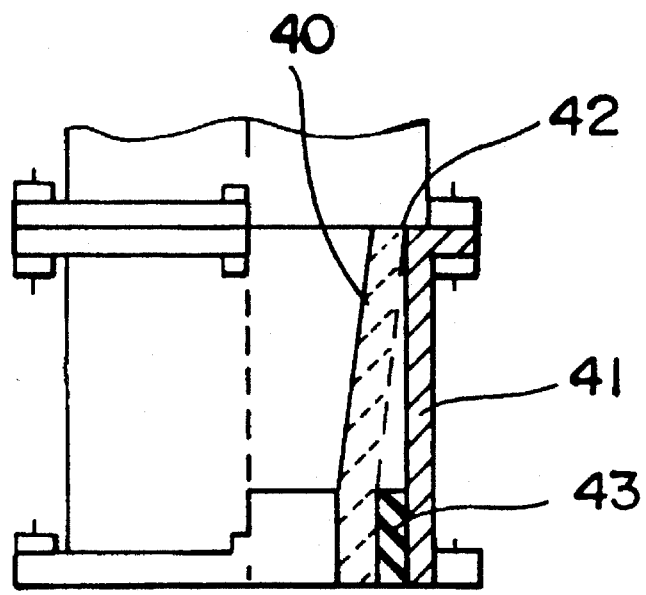
FIG. 7 is a schematic view of a cross section of a steel housing and apex used in hydrocyclone separators.
Figure 8:
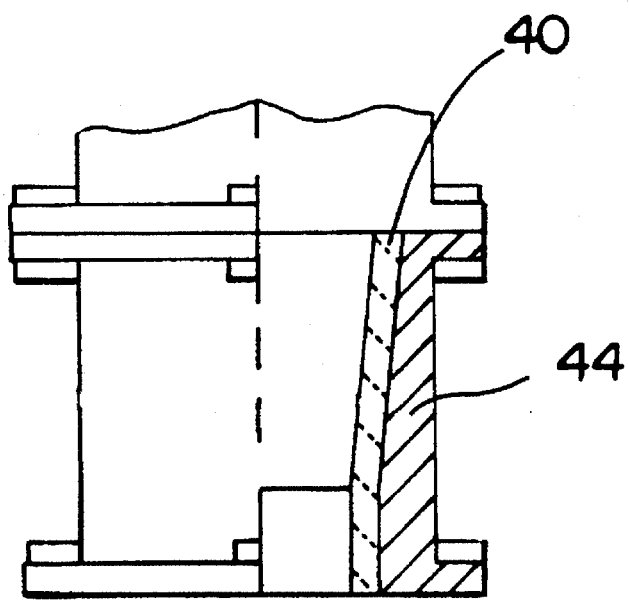
FIG. 8 is a schematic view of a cross section of an apex surrounded by a polymer-based material which replaces the steel housing of the prior art in accordance with one embodiment of the present invention.

FIG. 7 is a schematic cross section of a typical assembly which incorporates a ceramic, ceramic matrix composite, or metal matrix composite apex for use with a hydrocyclone separator. Typically, the apex 40 is inserted into a steel housing 41 and may be bonded at the joint indicated by 42 by an appropriate material such as an epoxy. Moreover, a rubber-type clamping ring or spacer 43 may also used to secure the apex within the steel housing. The present invention provides an embodiment which eliminates the need for the steel housing, the epoxy adhesive, and the rubber clamping ring. Specifically, in a preferred embodiment, a polymer-based material 44 is cast around the apex 40 in the configuration of a steel housing as depicted in FIG. 8. As one skilled in the art will now recognize, the use of a single unit comprising a ceramic, ceramic matrix composite, or metal matrix composite apex encased by a polymer-based housing overcomes many difficulties associated with the prior art. Specifically, the present invention eliminates the need to remove worn parts (i.e., worn out apexes due to abrasion) from the housing. Moreover, the present invention eliminates the need to install a new part into the housing when the old part is worn out. Furthermore, the present invention eliminates the need to replace worn housings, since the housing is now provided in a disposable form integral with the apex. Also, the present invention provides for a lighter weight construction due to the replacement of the steel housing with a polymer-based material, thus, providing for easier installation and reduced shipping charges. Finally, the present invention provides for lower costs when compared to the prior art.

To produce this preferred embodiment, a skilled artisan needs to simply produce a ceramic, ceramic matrix composite, or metal matrix composite apex in any suitable manner. Preferred ceramic and ceramic matrix composite apexes may be formed according to the methods of the commonly owned patents and patent applications discussed above. Moreover, it may also be desirable to form a metal matrix composite apex by the methods described in the commonly owned patents and patent applications discussed above. However, any suitable method for forming the apex may be used.

Once the apex is formed, a negative mold in the shape of a suitable housing may be placed around the apex. Thereafter, any suitable polymer-based material (e.g., a pourable polyurethane, polymer matrix composite, or polymer, or combinations thereof) may be cast into the space between the apex and the negative mold. The polymer-based material is then allowed to cure and after curing, the negative mold may be removed from the assembly, thus, producing a polymer-based housing which replicates the negative mold. Thereafter, little or no machining is necessary, since the negative mold may also incorporate, if needed, the bolt hole pattern in the flange portion of the housing, if the housing is to be secured to the remainder of the hydrocyclone separator using bolts. However, it should be understood that if a clamping system were to be used to attach the housing to the remaining portion of the hydrocyclone separator, then it would not be necessary to cast the housing with the bolt hole pattern. In other words, the apex/housing body of the present invention may be incorporated into any suitable hydrocyclone separator system.

As discussed in the shaft sleeve embodiment of the instant invention, the polymer-based housing of the hydrocyclone separator embodiment may be, like the compliant interface material, any suitable polymer, polymer matrix composite, polyurethane, rubber, plastic, or the like, as long as the material can withstand the environment to which it will be subjected. For example, the material should be, preferably, pourable at or near room temperature and be capable of flowing into relatively minute spaces (e.g., to closely replicate the bolt hole patterns in the flange portion of the housing). Furthermore, when cured, the polymer-based material should provide adequate strength so that the housing may be bolted or clamped to the remainder of the hydrocyclone separator. Additionally, it may be desirable that the polymer-based material provide an attractive finish and also resist chipping or cracking due to, for example, handling or installation misuse.

Various demonstrations of the present invention are included in the Example immediately following. However, the Example should be considered as being illustrative and should not be construed as limiting the scope of the invention as defined in the appended claims.

EXAMPLE 1

The present Example demonstrates, among other things, a method for forming a shaft sleeve comprising a shaped self-supporting body formed by the directed oxidation of a parent metal into a filler material mixture having a compliant interface material.

About 14 kilograms of a sediment casting mixture comprising nominally by weight about 55% 90 grit green silicon carbide (Exolon, Tonawanda, N.Y.), about 24% 220 grit green silicon carbide (Exolon, Tonawanda, N.Y.), about 0.1% Colloids 581-B defoamer (Colloids, Inc., Newark, N.J.), about 17% deionized water, about 2.3% Nyacol colloidal silica (Nyacol Products, Ashland, Mass.) and about 1.6% Elmer's® professional polyvinyl acetate glue (Borden Company, Columbus, Ohio) was prepared. Specifically, the defoamer, the Elmer's® professional polyvinyl acetate glue and deionized water were combined in a stainless steel bowl and hand mixed until a homogeneous solution was formed. Subsequently, the 90 grit green silicon carbide and the 220 grit green silicon carbide were combined with the liquids. This combination was then mixed by hand to eliminate any agglomeration of materials while assuring that the silicon carbide filler material was fully wetted. The mixing was completed after about 10 minutes thereby forming a sediment castable filler material mixture.

A three piece aluminum mold was then assembled so as to form a hollow cylindrical cavity having a outer diameter measuring about 5.0 inches (127 mm), an inner diameter measuring about 4.6 inches (117 mm) and a height measuring at least about 9.0 inches (229 mm). The aluminum mold was then placed onto a Centton Model VR5D1 vibration table (FMC Corporation, West Reading, Pa.). After the oscillator to the vibrating table was turned on, the intensity setting for the oscillator was adjusted to a level such that the aluminum mold would vibrate without moving along the surface of the table. Handfuls of the sediment castable filler material mixture were then placed into the cavity of the aluminum mold to fill the mold at about ½ inch (13 mm) increments. To assure the even distribution and aid in the de-airing of the castable filler material mixture, a polyethylene rod having diameter of about 0.5 inches (13 mm) and a length of about 2 feet was placed into the cavity of the aluminum mold and contacted with the castable slurry material. The steps were repeated until the cavity of the aluminum mold was substantially completely filled. Then the vibrating table and the substantially filled mold were allowed to vibrate for about 1 hour. During this time, the solids in the castable filler material mixture settled thereby producing surface water at the top of the mold. The water was removed from the mold using a combination of a pipet and a sponge. Once the water had been removed, the aluminum mold and its contents were allowed to sit in air at about room temperature for about an hour while the vibrating table remained on.

The aluminum mold and its contents were then placed into a freezer set at about $-15°$ F. ($-20°$ C.) approximately at the center of the freezer. After about 8 hours, the mold and its contents were removed from the freezer and the now frozen preform was removed from the aluminum mold using a hydrolic press.

The frozen preform was then placed onto a loose bed of 14 grit green silicon carbide particulate supported by an about 0.25 inch (6.5 mm) aluminum plate. After the preform had been stabilized to prevent it from rolling thereby forming a drying setup. A temperature of about $71°$ C. ($160°$ F.), was established in a convection oven (Blue M, Blue Island, Ill.), and the drying setup was placed in the oven for about 14 hours. Upon removal from the oven, any 14 grit green silicon carbide which had adhered to the outer surfaces of the hollow cylinder was removed, thereby preparing the preform for growth initiation and barrier coating.

A barrier material mixture comprising by weight about 60% −325 mesh Nyad SP wollastonite (purchased from East Tech, Philadelphia, Pa.), about 34% commercially available isopropyl alcohol, and about 6% of a solution comprising 5 weight percent klucel "L" (E. I. du Pont de Nemours and Company, Inc., Wilmington, Del.) and the balance ethyl alcohol was prepared. Specifically, the 5 weight percent klucel "L" ethyl alcohol solution was prepared by combining about 100 grams of klucel "L" with about 1900 grams of commercially available ethyl alcohol. After the klucel "L" ethyl alcohol solution was prepared, the −325 mesh wollastonite, the commercially available isopropyl alcohol, the 5 percent klucel "L" ethyl alcohol solution and about 1.8 kilograms of ¼ inch (6.5 mm) diameter alumina mixing media were combined in a one gallon Nalgene® plastic jar. The jar was closed and sealed and then placed on a jar mill for about 45 minutes. The jar and its contents were then removed from the jar mill and the contents were poured through a colander to separate the ¼ inch (6.5 mm) diameter alumina mixing media from the barrier mixture.

Figure 5:
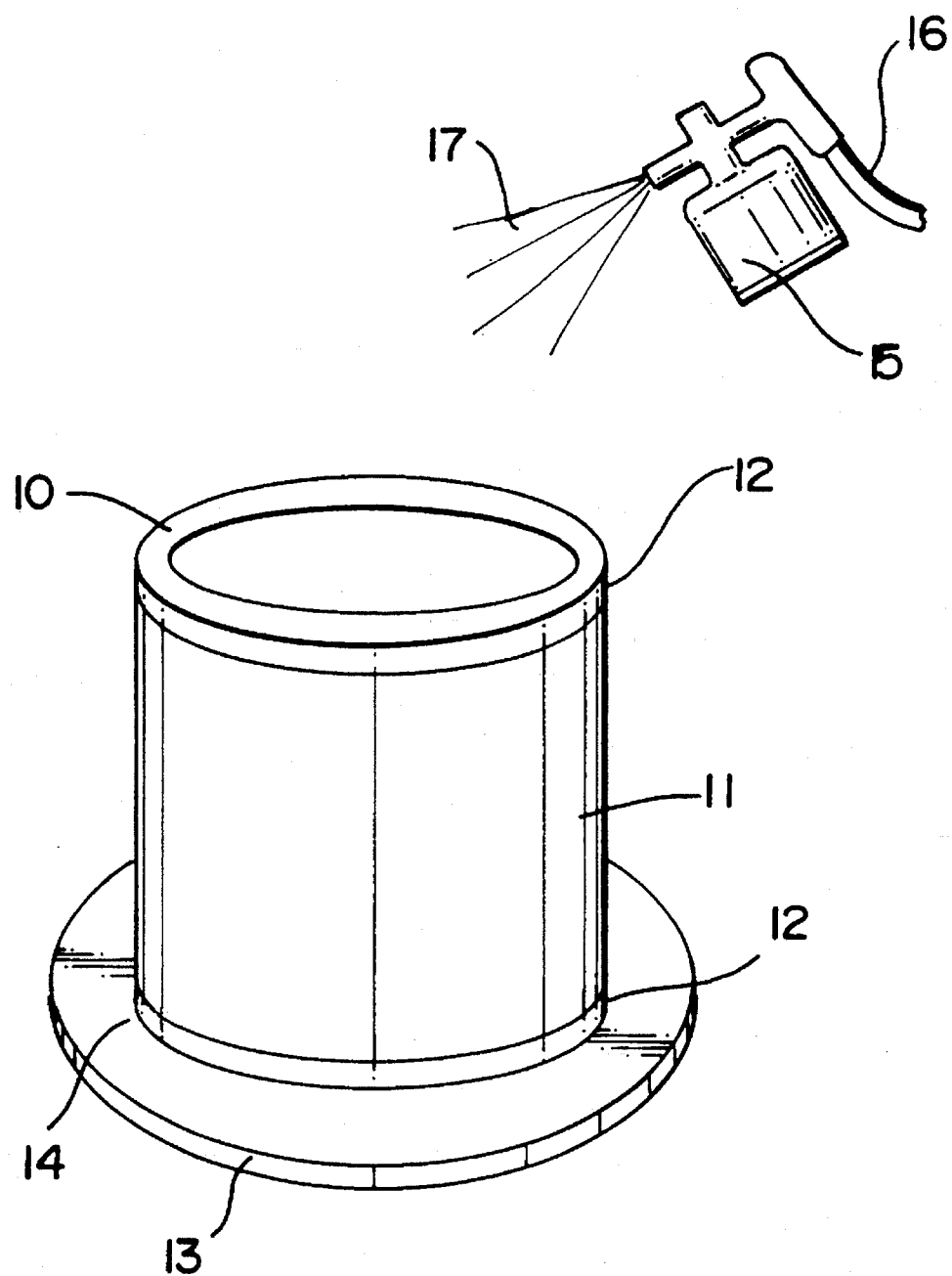
FIGS. 5 and 6 are schematic views of lay-ups used to produce a shaft sleeve according to Example 1.

In the meantime, the preform was prepared for barrier coating. Specifically, as depicted in FIG. 5, the preform 10 was prepared for a spray coating of the inner surface by covering the outer surface with a piece of brown paper 11 held in position on the outer surface of the preform with masking tape 12. The paper covered hollow cylinder was then placed onto a turn table 13 also covered with brown paper 14. The reservoir chamber 15 of a Binks spray gun having a devil-bise JGV-560 nozzle (Binks, Franklin Park, Ill.) was filled with the barrier material mixture. Compressed air supply running through hose 16 was set at about 20 pounds per square inch (1.046 kilograms per centimeter squared). The barrier material spray 17 from the spray gun was inclined at about a 45° angle with the inner surface of the preform 10 as the turn table 13 was rotated thereby coating the inner surface of the hollow cylinder. In about 15 minutes, after the barrier material coating had dried, the brown paper on the outer surface of the hollow cylinder was removed, thereby preparing the hollow cylinder for the application of a growth initiator.

A growth initiator mixture comprising by weight about 18%, 5% by weight klucel "L" ethanol solution, about 1.3% Bentone inorganic thixotropic agent, about 30.7% isopropyl alcohol, and about 50% 200 grit silicon metal powder. After the ingredients for the growth initiator mixture were placed in a plastic jar and the jar was sealed, the jar and its contents were mixed by vigorously hand shaking the jar. The growth initiator mixture was then placed into a reservoir jar of a model 62-2 Pasche airbrush. The hollow cylindrical preform was replaced on the turn table. The growth initiation mixture material was then spray coated on the outer surface of the hollow cylinder to a thickness of at least 0.04 inches. After allowing the growth initiation mixture material to dry for about 30 minutes, the preform was ready for incorporation into a growth lay-up.

Figure 6:
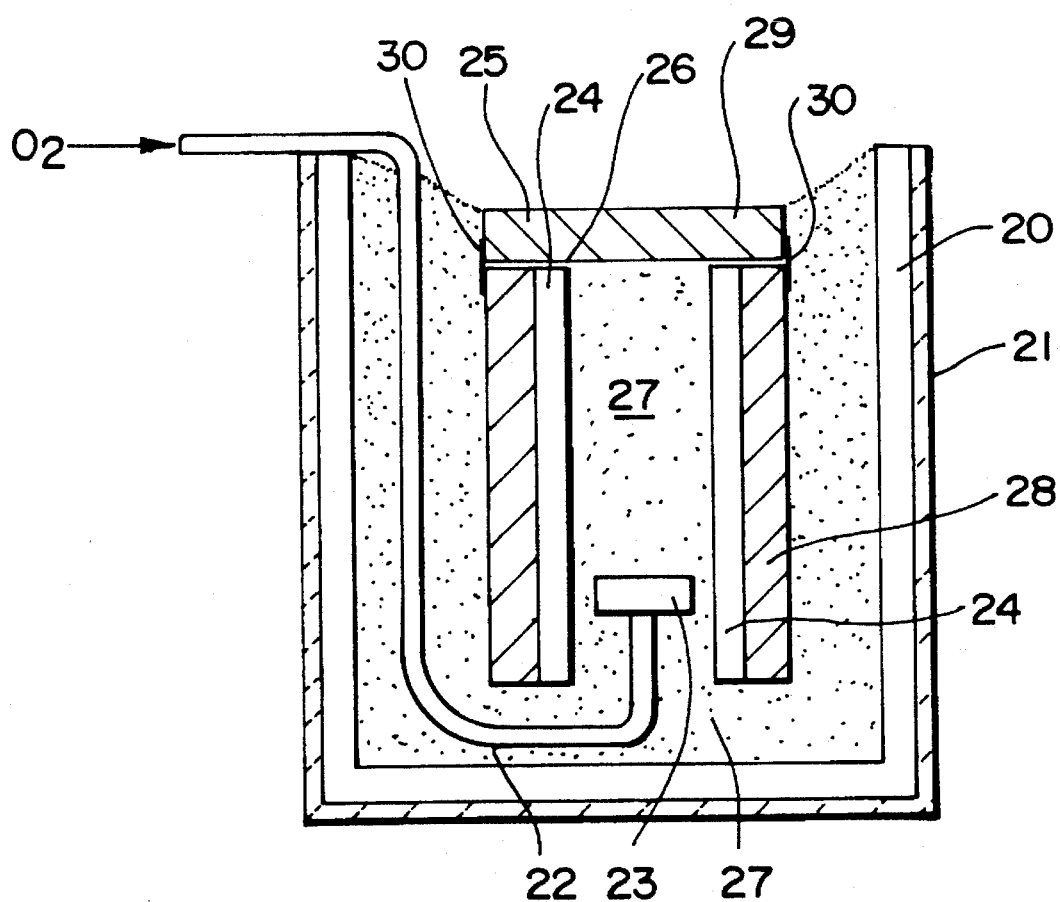

The growth lay-up is depicted in FIG. 6. Specifically, a refractory boat 20 made from Castolast 3000 refractory mix (New Castle Refractories, New Castle, Pa.) and supported by a steel shell 21 was obtained. About 2 inches of Nyad SP coarse wollastonite (East Tech, Philadelphia, Pa.) was poured into the bottom of the refractory boat 20 and leveled to make a layer of about 2 inches in the bottom of the refractory boat 20. A stainless steel tube 22 was bent to the configuration as depicted in FIG. 6 and embedded in the wollastonite material about an inch below the surface of the 2 inch wollastonite coating. A reticulated ceramic foam 23 measuring about 2.75 inches in diameter and about 1 inch thick and having a receptacle measuring about 1½ inch in diameter and about ½ inch high was placed on the end of the stainless steel tube 22. The hollow cylinder preform 24 coated with an initiator layer 25 and a barrier layer 26 was then placed coaxially with the stainless steel tube 22 projecting upward from the bottom of the reticulated ceramic 23. The inner diameter of the hollow cylinder preform 24 was then filled with coarse wollastonite 27 and a hollow cylinder alloy ingot 28 comprising by weight about 14.5% Si, 3.5% Cu, 3.0% Zn, 0.25% Mg, 0.90% Fe, and the balance Al and having an inner diameter of about ⅛ inch greater than the outer diameter of the preform and being substantially the same length as the preform was placed so that its inner surface faced the outer surface of the growth initiator 25 coated surface of the preform. A parent metal alloy cap 29 having substantially the same composition as the alloy ingot 28 was then placed in contact with the hollow cylinder parent metal ingot 28. The gap between the hollow cylinder ingot 28 and the parent metal alloy cap 29 was covered with commercially available duct tape 30. The remaining space between the parent metal ingots and the refractory boat 20 was then filled with coarse wollastonite material as schematically depicted in FIG. 6 thereby completing the formation of the growth lay-up.

The growth lay-up and its contents were then placed into an air atmosphere resistance heated furnace. The oxygen supply line 22 was connected to an oxygen source and the furnace door was closed. The furnace and its contents were then heated from about room temperature to about 910° C. in about 9 hours; held at about 910° C., while flowing oxygen through the supply line 909 at a flow rate of about 10 cubic centimeters per hour, for about 150 hours; and then cooled from about 910° C. to about room temperature in about 10 hours. After the oxygen flow rate was interrupted and the oxygen supply disconnected, the lay-up was removed from the furnace.

The lay-up was then disassembled to reveal that the parent metal had reacted with the oxygen to form oxidation reaction product which had embedded substantially completely the preform, thus forming a ceramic matrix composite body. The ceramic matrix composite body was then machined. Specifically, the outer diameter was machined to a smooth finish and the length of the composite was machined to final tolerance. The ceramic matrix composite was then prepared for the application of a polyurethane compliant layer.

Specifically, the inner surface of the ceramic matrix composite shaft sleeve was prepared by lightly sandblasting the entire inner surface to remove any debris and loose pieces. The shaft sleeve was then placed under a hood and the inner surface of the sleeve was thoroughly cleaned with commercially available trichloroethylene utilizing clean paper towels. After the trichloroethylene had evaporated, the inner surface of the shaft sleeve was prepared for bonding by applying a thin coat of Chemlok® AP-134 primer (Lord Corporation, Erie, Pa.) to the inner surface of the shaft sleeve utilizing a small paint brush. The primer was allowed to dry for about 1 hour.

After about 1 hour, the shaft sleeve was placed on an aluminum support plate with one open end of the shaft sleeve contacting the aluminum plate. The area between the shaft sleeve and the aluminum plate was then sealed with clay to prevent leakage of the polyurethane mixture.

The polyurethane was prepared in the following manner. One part by weight REN RP 6405 resin (Ciba-Geigy, East Lansing, Mich.) was mixed with one part by weight REN RP 6405 hardener (Ciba-Geigy, East Lansing, Mich.) utilizing a mixing stick. The hardener and resin were mixed until the resin was a homogeneous milky white.

A mandrel having a diameter of about 4 inches and measuring about 9 inches long was lightly spray coated with REN RP78-1 Aerosol Silicone Release Agent (Ciba-Geigy, East Lansing, Mich.) and then placed concentrically into the cavity of the shaft sleeve and attached to the aluminum plate. The homogeneously mixed polyurethane was placed into a Super Vac-Mac vacuum bell jar (Rey Industries, Inc.). The vacuum bell jar was evacuated to about 28 mm mercury. After about 5 minutes, ambient pressure was re-established within the vacuum bell jar and the polyurethane was removed from the vacuum bell jar.

The polyurethane was then poured into the mold cavity in a smooth and continuous manner. After about 24 hours, the polyurethane had cured and the mandrel was removed from the center of the shaft sleeve.

The inner diameter of the shaft sleeve was then ready for machining to the necessary diameter to fit over a pump shaft.

While the preceding discussion includes very particular disclosure, various modifications to the disclosure may occur to an artisan of ordinary skill, and all such modifications should be considered to be within the scope of the claims appended hereto.

What is claimed:

1. A macrocomposite shaft sleeve, comprising:

a metal matrix composite having attached to at least a portion of one surface thereof a material comprising a polymer, wherein said metal matrix composite comprises a hollow cylindrical shaft sleeve, said shaft sleeve having a first end, a second end, an inner diameter surface, and an outer diameter surface, and wherein said material comprising a polymer is attached to at least a portion of said inner diameter surface of said shaft sleeve, wherein said material comprising a polymer is formed in the shape of a first ring and a second ring, said rings having a first end, a second end, an inner diameter surface, and an outer diameter surface, and wherein said first ring is attached at the first end of said shaft sleeve such that the outer diameter surface of said first ring is contacted with the inner diameter surface of said shaft sleeve at said first end, and said second ring is attached at the second end of said shaft sleeve such that the outer diameter surface of said second ring is contacted with the inner diameter surface of said shaft sleeve at said second end; and wherein at least a portion of said inner diameter surface of said shaft sleeve is not contacted with said first ring or said second ring.

2. The macrocomposite shaft sleeve of claim 1, wherein said material comprising a polymer comprises at least one material selected from the group consisting of polymer matrix composites, polyurethanes, plastics and rubbers.

3. The macrocomposite shaft sleeve of claim 1, wherein said material comprising a polymer ameliorates stresses between a metal pump shaft and said metal matrix composite.

4. The macrocomposite shaft sleeve of claim 3, wherein said stresses are generated by differing coefficients of thermal expansion between said metal pump shaft and said metal matrix composite.

5. The macrocomposite shaft sleeve of claim 1, wherein said metal matrix composite comprises an aluminum metal matrix composite.

6. A macrocomposite shaft sleeve, comprising:

a wear resistant material comprising a ceramic having attached to at least a portion of one surface thereof a material comprising a polymer, wherein said ceramic comprises a hollow cylindrical shaft sleeve, said shaft sleeve having a first end, a second end, an inner diameter surface, and an outer diameter surface, and wherein said material comprising a polymer is formed in the shape of a first ring and a second ring, said rings having a first end, a second end, an inner diameter surface, and an outer diameter surface, and wherein said first ring is attached at the first end of said shaft sleeve such that the outer diameter of said first ring is contacted with the inner diameter surface of said shaft sleeve at said first end, and said second ring is attached at the second end of said shaft sleeve such that the outer diameter of said second ring is contacted with the inner diameter surface of said shaft sleeve at said second end; and wherein at least a portion of said inner diameter surface of said shaft sleeve is not contacted with said first ring or said second ring.

7. The macrocomposite shaft sleeve of claim 6, wherein said ceramic comprises a ceramic matrix composite.

8. The macrocomposite shaft sleeve of claim 7, wherein said ceramic matrix composite comprises an alumina oxidation reaction product which embeds at least one filler material.

9. The macrocomposite shaft sleeve of claim 6, wherein said ceramic comprises at least one oxidation reaction product.

10. The macrocomposite shaft sleeve of claim 9, wherein said at least one oxidation reaction product embeds at least one filler material.

11. The macrocomposite shaft sleeve of claim 10, wherein said at least one oxidation reaction product comprises alumina and said at least one filler material comprises silicon carbide.

12. The macrocomposite shaft sleeve of claim 9, wherein said at least one oxidation reaction product comprises alumina.

13. The macrocomposite shaft sleeve of claim 6, wherein said material comprising a polymer ameliorates stresses between a metal pump shaft and said ceramic.

14. The macrocomposite shaft sleeve of claim 13, wherein said stresses are generated by differing coefficients of thermal expansion between said metal pump shaft and said ceramic.

15. The macrocomposite shaft sleeve of claim 6, wherein said material comprising a polymer comprises at least one material selected from the group consisting of polymer matrix composites, polyurethanes, plastics and rubbers.

16. A macrocomposite shaft sleeve comprising:

a ceramic matrix composite material comprising an alumina oxidation reaction product embedding at least one filler material comprising silicon carbide, said ceramic matrix composite in the shape of a hollow cylindrical shaft sleeve, said shaft sleeve having a first end, a second end, an inner diameter surface and an outer diameter surface;

a material comprising a polymer in the shape of a first ring and a material comprising a polymer in the shape of a second ring, said first ring and said second ring having a first end, a second end, an inner diameter surface and an outer diameter surface;

wherein said first ring is attached at the first end of said shaft sleeve such that the outer diameter surface of said first ring is contacted with the inner diameter surface of said shaft sleeve at said first end and said second ring is attached at the second end of said shaft sleeve such that the outer diameter surface of said second ring is contacted with the inner diameter surface of said shaft sleeve at said second end; and wherein at least a portion of said inner diameter surface of said shaft sleeve is not contacted with said first ring or said second ring.

17. The macrocomposite shaft sleeve of claim 16, wherein said first ring and said second ring comprise a polymer selected from the group consisting of polymer matrix composites, polyurethanes, plastics and rubbers.

* * * * *